United States Patent [19]

Alfons

[11] Patent Number: 5,496,896
[45] Date of Patent: Mar. 5, 1996

[54] CURABLE COMPOSITION BASED ON A MICHAEL ADDITION PRODUCT, PROCESSES FOR ITS PREPARATION AND ITS USE

[75] Inventor: Jung W. Alfons, Ascheberg, Germany

[73] Assignee: BASF Lacke & Farben Aktiengesellschaft, Munster, Germany

[21] Appl. No.: 43,137

[22] Filed: Apr. 1, 1993

Related U.S. Application Data

[63] Continuation of Ser. No. 411,523, filed as PCT/EP88/00251, Mar. 25, 1988, abandoned.

[30] Foreign Application Priority Data

Mar. 28, 1987 [DE] Germany ............... 37 10 431.4

[51] Int. Cl.$^6$ ............... C08L 51/00; C08F 265/06
[52] U.S. Cl. ............... 525/74; 525/77; 525/78; 525/79; 525/80; 525/286; 525/302; 525/303; 525/304; 525/309
[58] Field of Search ............... 525/77, 74, 79, 525/78, 80, 81, 157, 162, 163, 286, 302, 303, 304, 309, 386, 377; 526/307.5, 307.7, 318.42, 318.43, 320

[56] References Cited

U.S. PATENT DOCUMENTS

| | | | |
|---|---|---|---|
| 4,330,640 | 5/1982 | Buchwalter | 524/555 |
| 4,408,018 | 10/1983 | Bartman et al. | 525/300 |
| 4,644,036 | 2/1987 | Walz et al. | 525/386 |
| 4,711,944 | 12/1987 | Sherwin et al. | 525/162 |
| 4,801,646 | 6/1989 | Henton | 525/85 |
| 5,227,432 | 7/1993 | Joug | 525/286 |

FOREIGN PATENT DOCUMENTS

| | | |
|---|---|---|
| 0158161 | 10/1985 | European Pat. Off. |
| 0160824 | 11/1985 | European Pat. Off. |

*Primary Examiner*—Paul R. Michl
*Assistant Examiner*—Mark L. Warzel
*Attorney, Agent, or Firm*—Kenyon & Kenyon

[57] ABSTRACT

The invention relates to a curable composition containing as component A) compounds with at least two activated double bonds (I), these being α,β-unsaturated carbonyl compounds, α,β-unsaturated carboxylic acid esters or α,β-unsaturated nitriles, and compounds B) which contain at least two active hydrogen atoms or at least two groups with active hydrogen atoms or at least one active hydrogen atom and at least one group with an active hydrogen atom, and customary additives, catalysts, if appropriate pigments and an organic solvent. Either component A) or B) or components A) and B) are based on a branched soluble acrylate copolymer (P) which is obtainable by copolymerization of a) 3 to 30% by weight of monomers with at least two ethylenically unsaturated polymerizable double bonds,
b) 5 to 60% by weight of monomers with a functional group and
c) 5 to 92% by weight of other ethylenically unsaturated monomers, the sum of a), b) and c) being 100% by weight.

The invention also relates to processes for the preparation of the curable composition.

36 Claims, No Drawings

CURABLE COMPOSITION BASED ON A MICHAEL ADDITION PRODUCT, PROCESSES FOR ITS PREPARATION AND ITS USE

This application is a continuation of application Ser. No. 07/411,523, filed as PCT/EP88/00251, Mar. 25, 1988 abandoned.

The invention relates to a curable composition containing as component A) compounds with at least two activated double bonds (I), these being α,β-unsaturated carbonyl compounds, α,β-unsaturated carboxylic acid esters or α,β-unsaturated nitriles, and compounds B) which contain at least two active hydrogen atoms or at least two groups with active hydrogen atoms or at least one active hydrogen atom and at least one group with an active hydrogen atom, and customary additives, catalysts, if appropriate pigments and an organic solvent.

Compositions which are obtained by reacting compounds with at least two activated double bonds (I) with compounds containing active hydrogen atoms are known from DE-OS 35 08 399. These compositions react under the influence of bases to give a Michael addition product. The Michael acceptor component can be derived, for example, from hydroxyl-containing acrylate resins, epoxy resins, oligomeric polyols or oligomeric polyamines. The Michael donor component can be derived, for example, from polyols, polyamines or polymercaptans. The binders described in DE-OS 35 08 399 can be used as two-component systems for coatings. They readily cure under catalysis by bases at room temperature and at elevated temperatures. The advantages of the systems described are that they require no free isocyanates for curing. However, the known systems have disadvantages in respect of the resistance to solvents, resistance to chemicals and elasticity of the coatings obtained from them.

Michael addition products of acrylate polymers with acetoacetate groups and polyacrylate crosslinking agents with double bonds activated for the Michael addition are known from U.S. Pat. No. 4,408,018. The systems known from U.S. Pat. No. 4,408,018 also lead to coatings with adverse properties in respect of resistance to solvents, resistance to chemicals and elasticity.

EP-A-158,161 describes coating compositions which cure completely at low temperatures and are based on branched acrylate copolymers containing hydroxyl groups and melamine-formaldehyde resins or polyisocyanates as crosslinking agents. 3 to 25% by weight of monomers with at least two polymerizable, olefinically unsaturated double bonds are used in the polymerization for the preparation of the acrylate copolymer. The coating agents based on the systems described have a good resistance to gasoline and a good resistance towards long-term exposure to water or water vapor. However, the melamine-formaldehyde resins or polyisocyanates used as crosslinking agents have an adverse effect for toxicological reasons.

The object of the present invention was to provide coating agents which can cure completely at low temperatures and can therefore preferably be used for automobile refinishing, are largely free from isocyanates and have improved properties, compared with the systems from DE-OS 35 08 399, in respect of resistance to solvents, resistance to chemicals and elasticity.

According to the invention, this object is achieved by the curable composition of the abovementioned type when either component A) or component B) or components A) and B) are based on a branched soluble acrylate copolymer (P) which is obtainable by copolymerization of a) 3 to 30% by weight of monomers with at least two ethylenically unsaturated polymerizable double bonds, b) 5 to 60% by weight of monomers with a functional group and c) 5 to 92% by weight of other ethylenically unsaturated monomers, the sum of a), b) and c) being 100% by weight.

The components A) are compounds which contain activated olefinically unsaturated groups and can be used as Michael acceptors. Under the influence of suitable catalysts, compounds of component B) form carbanions which are added on to the activated double bonds of component A). The compounds of component B) are Michael donors. According to the invention, at least one of components A) and B) should be based on a branched soluble acrylate copolymer (P), that is to say should be obtainable from this. According to the invention, component A) can therefore be obtainable by reaction of the branched soluble acrylate copolymer (P) with a compound (1) containing at least one activated double bond (I).

It is also possible for component B) to be obtainable by reaction of the branched soluble acrylate copolymer (P) with a compound (2) which, apart from a group which reacts with the acrylate copolymer (P), contains at least one active hydrogen atom or at least one group with an active hydrogen atom.

The soluble branched acrylate copolymer (P) is thus used according to the invention as a precursor for the components A) and/or B). The branched acrylate copolymer is obtainable by copolymerization of 3 to 30% by weight, based on the total weight of the monomers, of monomers with at least two ethylenically unsaturated double bonds.

Compounds of the general formula

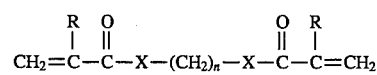

in which

R=H or CH$_3$,

X=O, NR' or S, where R'=H, alkyl or aryl, and n=2 to 8, can advantageously be used as component a).

Examples of such compounds are hexanediol diacrylate, hexanediol dimethacrylate, glycol diacrylate, glycol dimethacrylate, butanediol diacrylate, butanediol dimethacrylate, trimethylolpropane triacrylate and trimethylolpropane trimethacrylate. Divinyl compounds, such as, for example, divinylbenzene, are furthermore also suitable as component a). Mixtures of multifunctional monomers can of course also be used.

Component a) can also be a reaction product of a carboxylic acid with a polymerizable, olefinically unsaturated double bond and glycidyl acrylate and/or glycidyl methacrylate. Component a) can furthermore be a polycarboxylic acid or unsaturated monocarboxylic acid esterified with an unsaturated alcohol containing a polymerizable double bond.

Reaction products of a polyisocyanate with unsaturated alcohols or amines containing polymerizable double bonds are advantageously used as component a). An example which may be mentioned here is the reaction product of one mole of hexamethylenediisocyanate and two mole of allyl alcohol.

Another advantageous component a) is a diester of polyethylene glycol and/or polypropylene glycol with an average molecular weight of less than 1,500, preferably of less than 1,000, and acrylic acid and/or methacrylic acid.

Monomers with a functional group are used as component b), the choice of this functional group depending on the nature of the compounds (1) and (2); the components (A) or (B) are obtained by reaction of the soluble branched acrylate copolymers with the compound (1) or (2). The monomers b) which can be used according to the invention will be dealt with later.

The other polymerizable monomers of component c) can advantageously be chosen from the group comprising styrene, vinyltoluene, alkyl esters of acrylic acid and of methacrylic acid, alkoxyethyl acrylates and aryloxyethyl acrylates and the corresponding methacrylates, and esters of maleic and fumaric acid. Further examples which may be mentioned are methyl acrylate, ethyl acrylate, propyl acrylate, butyl acrylate, isopropyl acrylate, isobutyl acrylate, pentyl acrylate, isoamyl acrylate, hexyl acrylate, 2-ethylhexyl acrylate, octyl acrylate, 3,5,5-trimethylhexyl acrylate, decyl acrylate, dodecyl acrylate, hexadecyl acrylate, octadecyl acrylate, octadecenyl acrylate, pentyl methacrylate, isoamyl methacrylate, hexyl methacrylate, 2-ethylbutyl methacrylate, octyl methacrylate, 3,5,5-trimethylhexyl methacrylate, decyl methacrylate, dodecyl methacrylate, hexadecyl methacrylate, octadecyl methacrylate, butoxyethyl acrylate, butoxyethyl methacrylate, methyl methacrylate, ethyl methacrylate, propyl methacrylate, isopropyl methacrylate, butyl methacrylate, cyclohexyl acrylate, cyclohexyl methacrylate, acrylonitrile, methacrylonitrile, vinyl acetate, vinyl chloride and phenoxyethyl acrylate. Other monomers can be used as long as they do not lead to undesirable properties of the copolymer. The choice of component c) largely depends on the desired properties of the acrylate copolymer in respect of elasticity, hardness, compatibility and polarity. These properties can in part be controlled with the aid of the known glass transition temperatures of the monomers.

Component b) of the acrylate copolymer can advantageously be an ethylenically unsaturated monomer containing hydroxyl groups. Examples here are hydroxyalkyl esters of acrylic acid and/or methacrylic acid with a primary hydroxyl group. Component b) can also be at least in part a reaction product of one mole of hydroxyethyl acrylate and/or hydroxyethyl methacrylate and, on average, two mole of ε-caprolactone. However, hydroxyl-containing esters of acrylic acid and/or methacrylic acid with a secondary hydroxyl group can also be used as the monomers containing hydroxyl groups. These are advantageously reaction products of acrylic acid and/or methacrylic acid with the glycidyl ester of a carboxylic acid with a tertiary α-carbon atom. Examples of ethylenically unsaturated monomers containing hydroxyl groups are hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Examples of OH-monomers with a secondary OH group are 2-hydroxypropyl acrylate, 2-hydroxybutyl acrylate, 3-hydroxybutyl acrylate and the corresponding methacrylates.

Compositions according to the invention in which component A) is based on a soluble crosslinked acrylate copolymer, component b) of the acrylate copolymer being a monomer containing hydroxyl groups, and compound (1) is a monoester of α,β-unsaturated carboxylic acids are advantageous. In this case, after the polymerization, the branched copolymer containing hydroxyl groups is reacted with monoesters of α,β-unsaturated carboxylic acids in a transesterification reaction, so that a branched polyacrylate with free olefinically unsaturated double bonds is obtained. The resulting components A) can then be combined with the components B) to give a Michael addition product. In this case, possible advantageous compounds (1) are esters of α,β-unsaturated carboxylic acids, the ester groups of which have not more than 4 to 6 carbon atoms, such as, for example, methyl acrylate, ethyl acrylate, propyl acrylate, butyl acrylate, isopropyl acrylate, isobutyl acrylate, pentyl acrylate, the corresponding methacrylates and the corresponding esters of fumaric acid, maleic acid, crotonic acid and dimethylacrylic acid. The compounds (1) are reacted with the OH groups of the branched acrylate copolymer (P) in known transesterification reactions.

Other preparation methods for component A) are described below:

Component A) is advantageously based on a soluble pre-crosslinked acrylate copolymer (P), component b) of which is a monomer containing hydroxyl groups, the acrylate copolymer containing hydroxyl groups being reacted with an α,β-unsaturated carboxylic acid (compound (1)). In this case, component A) is obtained by esterification of a branched acrylate copolymer containing hydroxyl groups with an unsaturated carboxylic acid.

Component A) can furthermore advantageously be prepared by reaction of the acrylate copolymer (P) containing hydroxyl groups, described above, with a compound which, in addition to the group (I), contains an isocyanate group. The reaction between this compound (1) and the branched acrylate copolymer in this case takes place with the formation of a urethane bond. The compound (1), which, in addition to the group (I), contains an isocyanate function, is advantageously an isocyanatoalkyl ester of an unsaturated carboxylic acid of the general formula

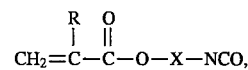

in which

R=H, CH$_3$ or C$_2$H$_5$ and

X=(CH$_2$)$_n$, where n=1–12; however, it can also be m-isopropenyl-α,α-dimethylbenzyl isocyanate, or can be chosen from the group comprising reaction products of diisocyanates with OH—, NH—, SH—or COOH— functional derivatives of acrylic acid, methacrylic acid, fumaric acid, maleic acid, crotonic acid and dimethylacrylic acid.

To prepare component A), the branched acrylate copolymer containing hydroxyl groups is advantageously reacted with a compound (1) which is an amide, containing alkoxymethyl groups, of an α,β-unsaturated carboxylic acid, or corresponds to the general formula

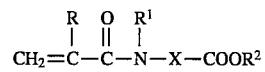

in which

R=H or CH$_3$,

R$^1$=H, alkyl or aryl,

R$^2$=alkyl and

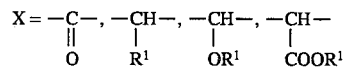

Examples of such compounds are methoxymethylacrylamide, methoxymethylmethacrylamide, butoxymethylacrylamide, butotymethylmethacrylamide, isobutoxymethylacrylamide, isobutoxymethylmethacrylamide, analogous amides of fumaric acid, crotonic acid and dimethylacrylic acid and glycolic acid derivatives, such as methylacrylamido-glycolate methyl ether, butylacrylamido-glycolatebutyl ether, methylacrylamido-glycolate and butylacrylamido-glycolate.

Component A), which is based on a branched soluble acrylate copolymer and contains at least two activated double bonds, can also be prepared by reaction of an acrylate copolymer containing epoxide groups and a compound (1) containing a carboxyl or amino group. In this case, a monomer containing ethoxide groups, such as, for example, glycidyl esters of unsaturated carboxylic acids or glycidyl ethers of unsaturated compounds, is used as the monomer b) for the preparation of the acrylate copolymer (P). Examples which may be mentioned of component b) are: glycidyl acrylate, glycidyl methacrylate, glycidyl esters of maleic and fumaric acid, glycidyl vinyl phthalate, glycidyl allyl phthalate and glycidyl allyl malonate. The epoxide groups of the acrylate copolymer are then reacted with the carboxyl or amino groups of the compound (1). The compound (1) is advantageously chosen from the group comprising acrylic acid, methacrylic acid, crotonic acid, dimethylacrylic acid, monomethyl fumarate, and reaction products of carboxylic acid anhydrides and hydroxyalkyl esters of α,β-unsaturated acids, such as adducts of hexahydrophthalic anhydride, phthalic anhydride, tetrahydrophthalic anhydride or maleic anhydride and hydroxyethyl (meth)acrylate, hydroxypropyl (meth)acrylate and hydroxybutyl (meth)acrylate. The compound (1can furthermore be t-butylaminoethyl (meth)acrylate, bisacrylamidoacetic acid or bis(acrylamidomethyl)amine. Compounds with several activated double bonds, such as, for example, bisacrylamidoacetic acid, are particularly preferably used.

The branched soluble acrylate copolymer (P) can contain monomers with ester functions as the functional monomer b). The esterification alcohol should advantageously contain not more than 6 carbon atoms. To prepare component A), the acrylate copolymer prepared in this manner is reacted with a compound (1 which, in addition to the group (I), contains an OH, NH or SH group. Possible components b) are alkyl esters of acrylic acid, methacrylic acid, crotonic acid, maleic and fumaric acid, such as, for example, the corresponding methyl, ethyl, propyl, isopropyl, butyl, isobutyl and pentyl esters. Longer-chain alcohol radicals in the ester group are less favorable since their transesterification and their removal by distillation after the transesterification require too high temperatures. Aminoalkyl esters of the α,β-unsaturated carboxylic acids mentioned are also possible. Component A) is then obtained by transesterification or transamidation reactions. These reactions are known to the expert and require no further explanation.

Branched acrylate copolymers containing isocyanate groups can also be used for the preparation of component A). In this case, monomers containing NCO groups are used as the monomer b). The resulting acrylate copolymer containing isocyanate groups is then reacted with compounds (1) which, in addition to the group (I), contain OH, NH, SH or COOH groups. In this case, the monomers b) can be chosen from the group comprising vinylic isocyanates, such as, for example, vinyl isocyanates and m-isopropenyl-α,α-dimethylbenzyl isocyanate, and isocyanatoalkyl esters of α,β-unsaturated carboxylic acids, of the general formula

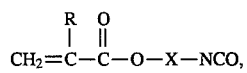

in which

R=H, CH$_3$ or C$_2$H$_5$ and

X=(CH$_2$)$_n$, where n=1–12.

Adducts of, for example, isophorone diisocyanate on hydroxyalkyl (meth)acrylates, such as, for example, hydroxyethyl methacrylate, can also be used as component b). It is advantageous to choose those compounds which, in addition to the OH, NH, SH or COOH group, contain two or more structural elements (I) for the addition. Two or more double bonds of type (I) are in this way introduced in one addition step. This is advantageous in that the addition of hydroxyl groups onto isocyanate groups gives urethane or urea groups, which in general greatly increase the viscosity of the binders, which is not always desirable. As an example of this there may be mentioned the reaction products of acrylic acid or methacrylic acid or another α,β-ethylenically unsaturated carboxylic acid and glycidyl acrylate or glycidyl methacrylate. This reaction leads to a free hydroxyl group, which is then added onto the NCO groups of the acrylate copolymer.

The monomer component b) for the preparation of the acrylate copolymer can advantageously be an amide, containing alkoxymethyl groups, of an α,β-unsaturated carboxylic acid, or a compound of the general formula

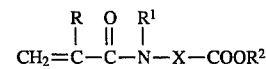

in which

R=H or CH$_3$,

R$^1$=H, alkyl or aryl,

R$^2$=alkyl and

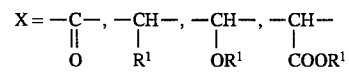

In this case, compounds which, in addition to the group (I), contain OH, NH or SH groups are used. Examples of the monomers b) are N-alkoxymethyl(meth)-acrylamides, such as methoxymethylacrylamide, methoxymethylmethacrylamide, isobutoxymethylacrylamide, isobutoxymethylmethacrylamide and isobutoxhymethylmethacrylamide. The alkoxy(meth)acrylamido-glycolate alkyl ethers are also suitable.

Component B) (sic) which is used as a Michael donor and contains active hydrogen atoms can, of course, also be based on the soluble branched acrylate copolymer. Some preparation methods for component B), which is obtained from an acrylate copolymer with a functional group and the compound (2), are described below.

The soluble branched acrylate copolymer preferably contains hydroxyl groups which react with the compounds (2) in a subsequent reaction. In addition to the active hydrogen atom or the group with active hydrogen atoms, the compounds (2) contain an ester or acid group. In this case, the monomers b) are preferably chosen from the group comprising hydroxyalkyl esters of α,β-unsaturated carboxylic acids. The compounds (2) are preferably chosen from the group comprising acetoacetic acid, cyanoacetic acid, malonic acid, cyclopentanonecarboxylic acid, cyclohexanonecarboxylic acid and the respective alkyl esters.

The monomers b) can also be monomers with glycidyl groups. In this case, the branched acrylate copolymer containing epoxide groups is reacted with (2), these compounds containing carboxyl or amino groups in addition to the group (I). Monomers with glycidyl groups have already been mentioned above. Suitable compounds (2) are acetoacetic acid, cyanoacetic acid, malonic acid, cyclopentanonecarboxylic acid and cyclohexanonecarboxylic acid. Component B) is preferably obtained by reaction of an acrylate copolymer containing carboxyl groups with compounds (2), which are reaction products of a polyepoxide with n mole of epoxide groups and (n-1) mole of a compound with carboxyl or amino-carboxyl (sic) or amino groups and the group with an active hydrogen. An example which may be mentioned of this is the reaction product of one mole of trimethylolpropane triglycidyl ether and two mole of cyanoacetic acid or two mole of acetoacetic acid. Ethylenically unsaturated monomers containing carboxyl groups, for example acrylic acid or methacrylic acid, are used as monomer component b) in this case.

A curable composition in which the soluble branched acrylate copolymer is obtainable by copolymerization of a) 3 to 30% by weight of dimethacrylates and/or divinyl compounds, b) 5 to 60% by weight of ethylenically unsaturated monomers with a functional group, c) 5 to 91% by weight of ethylenically unsaturated monomers and d) 0.1 to 20% by weight of ethylenically unsaturated monomers with a tertiary amino group, is particularly preferred.

Examples of component d) are N,N'-dimethylaminoethyl methacrylate, N,N'-diethylaminoethyl methacrylate, 2-vinylpyridine and 4-vinylpyridine, vinyl pyrroline, vinyl quinoline, vinyl isoquinoline, N,N'-dimethylaminoethyl vinyl ether and 2-methyl-5-vinylpyridine. In this case, components A) and/or B) thus contain tertiary amino groups, which catalyze the crosslinking reaction. These tertiary amino groups furthermore catalyze, for example, transesterification reactions with acrylic acid esters or methacrylic acid esters, which may be desirable.

The invention also relates to a process for the preparation of a curable composition containing, as component A), compounds with at least two activated double bonds (1), these being $\alpha, \beta$-unsaturated carbonyl compounds, $\alpha,\beta$-unsaturated carboxylic acid esters or $\alpha,\beta$-unsaturated nitriles, and components B) which contain at least two active hydrogen atoms or at least two groups with active hydrogen atoms or at least one active hydrogen atom and at least one group with an active hydrogen atom, and customary additives, catalysts, if appropriate pigments and organic solvent, which comprises first preparing the soluble branched acrylate copolymer (P) by copolymerization of a) 3 to 30% weight of monomers with at least two ethylenically unsaturated polymerizable double bonds, b) 5 to 60% by weight of monomers with a functional group and c) 5 to 92% by weight of other ethylenically unsaturated monomers, the sum of a), b) and c) being 100% by weight, in an organic solvent at 70° to 130° C., preferably at 90° to 120° C., using at least 0.5% by weight, preferably at least 2.5% by weight, based on the total weight of the monomers a), b) and c), of a polymerization regulator and using polymerization initiators, to give a pre-crosslinked, non-gelled product, and subsequently reacting the soluble branched acrylate copolymer (p) with a compound (1) which, in addition to a group which reacts with (p), contains at least one active double bond (I), to give component (A), and/or reacting the branched soluble acrylate copolymer (p) with a compound (2) which, in addition to a group which reacts with (P), contains at least one active hydrogen atom or at least one group with an active hydrogen atom, to give component (B), and process components (A) and (B) in an organic solvent, if appropriate with pigments and the customary additives, to a coating composition by mixing and, if appropriate, dispersing, and, shortly before use, adding a catalyst for complete curing.

In the preparation of the acrylate copolymer (p), it should be pointed out that a copolymer which is pre-crosslinked but not gelled is obtained. This is possible as a result of suitable polymerization conditions. Pre-crosslinking of the acrylate copolymer which, because of the specific reaction conditions, nevertheless does not lead to gelled products is brought about by using monomers with at least two ethylenically unsaturated groups. It is important that the polymerization is carried out at temperatures from 70° to 130° C., preferably at 90° to 120° C., with a relatively low polymerization solids content of about 50% by weight. Compounds containing mercapto groups, preferably mercapto ethanol, are preferably used as polymerization regulators. The choice of regulator depends, in particular, on the nature of the monomer component b). If the monomer component b) contains alkyl ester groups and is subsequently to be transesterified or transamidated with alcohols or amines, it is appropriate for little, if any, mercapto alcohols to be used as regulators, since otherwise there is the risk of premature gelling in the transesterification or transamidation.

If the monomer component b) is an OH-monomer and the resulting acrylate copolymer containing hydroxyl groups is to be reacted with a compound containing carboxyl groups in a transesterification reaction, it is appropriate to use little, if any, mercaptocarboxylic acids as regulators, since otherwise there is the risk of gelling. It should be mentioned here that, for example, 2-mercaptopropionic acid can nevertheless be used in these cases, since this compound has a carboxyl group on a secondary saturated carbon atom and is thus less reactive than an $\alpha,\beta$-unsaturated carboxylic acid.

The monomer b) must always be matched to the choice of regulator, and furthermore, for example, primary mercaptans and ethylenically unsaturated monomers with isocyanate groups, and ethylenically unsaturated monomers containing glycidyl groups and mercaptocarboxylic acids as regulators cannot be combined with one another.

The choice of the polymerization initiator depends on the content of ethylenically polyunsaturated monomers used. If the content is low, the initiators customary for such temperatures (sic), such as, for example, peroxy esters, can be used. If the content of ethylenically polyunsaturated monomers is high, initiators such as, for example, azo compounds are preferably used.

The reactions of the functional acrylate copolymer (P) with the compounds (1) and (2) which lead to formation of components (A) and (B) are reactions which are known to the expert, according to the nature of the functional group of the acrylate copolymer, such as, for example, esterification reactions, transesterification reactions, transamidation reactions and addition reactions to form urethane bonds, urea bonds and $\beta$-hydroxy ester groups.

The reaction between components (sic) (A), the Michael acceptor component, and component (B), the Michael donor component, is catalyzed by bases. The catalysts are added shortly before processing of the mixture of components A) and B). Strong bases, such as alkali metal hydroxides or alkali metal alcoholates, are known from U.S. Pat. No. 4,408,018 as catalysts for the Michael addition. However, these lead to too severe yellowing and clouding of the coating agent.

In the present invention, all the possible catalysts for Michael addition can be used, as long as they do not lead to yellowing of the coating agent. Suitable bases which can be used as catalysts for the Michael addition are described in DE-OS 35 08 399.

If tertiary amino groups are present in component A) and/or in component B), the use of catalysts can largely be dispensed with. In this case, it is advisable to mix components A) and B) with one another only shortly before processing.

Examples of suitable Michael catalysts are catalysts from the group comprising diazabicyclo-octane, halides of quaternary ammonium compounds, by themselves or as a mixture with alkyl silicates, amidines, organic phosphonium salts, tertiary phosphanes (sic), quaternary ammonium compounds and alkali metal alcoholates. The amount of catalyst is in general 0.01 to 5, preferably 0.02 to 2% by weight, based on the total solids content of the starting substance.

The curable compositions according to the invention cure completely in the temperature range from room temperature to about 100° C., but can also be used at higher temperatures.

As a result of the low curing temperatures, they are particularly suitable for automobile refinishing.

However, they can also be used as clear coats, fillers or top coats and as undercoats containing metallic pigments or as clear coats for multi-layer metallic coating.

The coatings obtained from the curable compositions have a very high resistance to solvents and resistance to chemicals.

The invention is described below in more detail with the aid of embodiment examples:

Preparation of a branched acrylate P1 according to the invention:
477 parts of xylene and
477 parts of cumine are initially taken in a 4 liter stainless steel kettle and heated up to 100° C.
150 parts of hexanediol diacrylate,
250 parts of hydroxyethyl methacrylate,
150 parts of ethylhexyl methacrylate,
200 parts of tert.-butyl methacrylate,
100 parts of cyclohexyl methacrylate,
150 parts of styrene and
38 parts of mercaptoethanol are weighed into the monomer tank and mixed.
28 parts of 2,2'-azobis(2-methylbutanenitrile),
56 parts of xylene and
56 parts of cumene are weighed into the initiator tank and mixed.

The contents of the monomer tank are metered in over 3 hours and the contents of the initiator tank are metered in over 3.5 hours. The additions are started simultaneously and the temperature is kept at 110° C. during the polymerization. The clear acrylate resin solution thus obtained has a viscosity of 2.9 dPas and a solids content of 51%.

Preparation of component A1:
369 parts of ethyl acrylate, 2.46 parts of hydroquinone monomethyl ether and 4.92 parts of dibutyltin oxide are added to 920 parts of the acrylate resin solution P1 in a stainless steel kettle and the mixture is slowly heated up to 80° to 100° C. A stream of air is passed continuously through the kettle. After several hours at this temperature, the temperature is slowly increased to 120° C., the ethanol being distilled off (over a column), and a total of 520 parts of ethanol, excess ethyl acrylate and a little solvent are distilled off; the mixture is then dissolved with 257 parts of butyl acetate.

The solids content of component A1 thus obtained is 54.7% and the viscosity is 1.3 dPas.

Preparation of component B1:
108 parts of ethyl acetoacetate are added to 960 parts of the acrylate resin solution P1 in a stainless steel kettle and the mixture is slowly heated up to 80° to 100° C. While slowly heating to 130° C., ethanol is distilled off over a column. Component B1 thus obtained has a solids content of 55.7% and a viscosity of 2.1 dPas.

Preparation of the acrylate resin solution P2:
483 parts of xylene and
483 parts of cumene are initially taken in a 4 liter stainless steel kettle and heated to 110° C.
150 parts of hexanediol diacrylate,
250 parts of hydroxyethyl methacrylate,
150 parts of ethylhexyl acrylate,
100 parts of cyclohexyl methacrylate,
200 parts of tert.-butyl acrylate,
150 parts of styrene and
38 parts of mercaptoethanol are weighed into the monomer tank, with mixing.
24 parts of 2,2'-azobis(2-methylbutanenitrile),
48 parts of xylene and
48 parts of cumene are weighed into the initiator tank and mixed.

The contents of the monomer tank are metered in over 3 hours and the contents of the initiator tank are metered in over 3.5 hours, during which the temperature in the kettle is kept at 110° C., the addition of the initiator being started 10 minutes later than the addition of the monomer; at the end of the additions, after-polymerization is carried out for 3 hours. The clear acrylate resin solution P2 thus obtained has a viscosity of 4.6 dPas and a solids content of 50.2%.

Preparation of component B2:
1,041 parts of the acrylate resin solution P2 and 138 parts of ethyl acetoacetate are heated up to 80° to 100° C. in a stainless steel kettle. The mixture is then slowly heated up to 130° C., ethanol being distilled off over a column. Component B2 thus prepared has a viscosity of 2.2 dPas and a solids content of 54.8%.

Production and testing of clear lacquer coverings:
Clear lacquer 1:
15.85 parts of trimethylolpropane triacrylate,
84.15 parts of component B2 and
0.4 part of 1,8-diazabicyclo(5,4,0)-7-undecenes (sic) are mixed and applied in a wet film thickness of 150 µm to glass sheets using a doctor blade, and the film is dried as described.
30 minutes/80° C.:
Pendulum hardness after the oven: 175 seconds; resistant to premium gasoline after 3 hours.
Room temperature:
Pendulum hardness after 6 hours: 160 seconds; resistant to premium gasoline after 6 hours.
Clear Lacquer 2:
39.89 parts of a reaction product of one mole of trimerized hexamethylene diisocyanate and three moles of hydroxybutyl acrylate,
60.11 parts of component B1 and
0.4 part of 1,8-diazabicyclo(5,4,0)-7-undecenes (sic) are mixed, the mixture is applied in a wet film thickness of 150 µm to glass sheets using a doctor blade, and the film is dried as described.
30 minutes/80° C.:
Pendulum hardness after the oven: 175 seconds; resistant to premium gasoline after 3 hours. Room temperature:
Pendulum hardness after 6 hours: 81 seconds; resistant to premium gasoline after 6 hours.

I claim:
1. A curable composition containing as component A) a compound with at least two activated double bonds (I), selected from the group consisting of α,β-unsaturated car- bonyl compounds, α,β-unsaturated carboxylic acid esters and α,β-unsaturated nitriles, and a component B) which contains at least two active hydrogen atoms or at least two groups with active hydrogen atoms or at least one active hydrogen atom and at least one group with an active hydrogen atom and an organic solvent, wherein either component A) or component B) or components A) and B) are based on a branched soluble acrylate copolymer (P) which is obtained by copolymerization of:

a) 3 to 30% by weight of a monomer with at least two ethylenically unsaturated polymerizable double bonds, 5 to 60% by weight of a monomer with a functional group and 5 to 92% by weight of another ethylenically unsaturated monomer, the sum of a), b) and c) being 100% by weight.

2. A composition as claimed in claim 1, in which component (A) is obtained by reaction of a branched soluble acrylate copolymer (P) with a compound (1) which contains at least one activated double bond (I).

3. A composition as claimed in claim 1, in which component (B) is obtained by reaction of a branched soluble acrylate copolymer (P) with a compound (2) which, in addition to a group which reacts with the acrylate copolymer, contains at least one active hydrogen atom or at least one group with an active hydrogen atom.

4. A composition as claimed in claim 2, in which component b) of the acrylate copolymer is a monomer containing hydroxy groups and the compound (1) is a monoester of an α,β-unsaturated carboxylic acid.

5. A composition as claimed in claim 2, in which component b) of the acrylate copolymer is a monomer containing hydroxy groups and the compound (1) is an α,β-unsaturated carboxylic acid.

6. A composition as claimed in claim 2, in which component b) of the acrylate copolymer is a monomer containing hydroxy groups and the compound (1) contains an isocyanate group in addition to the group (I).

7. A composition as claimed in claim 2, in which component b) of the acrylate copolymer is a monomer containing hydroxyl groups and the compound (1) is an amide containing alkoxymethyl groups, of an α,β-unsaturated carboxylic acid, or corresponding to the general formula:

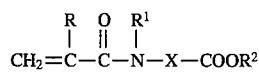

wherein:
R=H or CH$_3$,
R$^1$=H, alkyl or aryl,
R$^2$=alkyl and

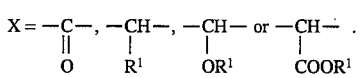

8. A composition as claimed in claim 2, in which the monomer b) contains as epoxide group and the compound (1) contains a carboxyl or amino group.

9. A composition as claimed in claim 2, in which the component b) contains an ester group comprised of an esterifying acid and an esterifying alcohol, the esterifying alcohol containing not more than 6 carbon atoms, and the compound (1) contains an OH, NH or SH group in addition to the group (I).

10. A composition as claimed in claim 2, in which the monomer b) contains isocyanate groups and the compound (1) contains an OH, NH, SH or COOH group in addition to the group (I).

11. A composition as claimed in claim 2, in which b) is an amide containing alkoxymethyl group, of an α,β-unsaturated carboxylic acid, or a compound of the general formula:

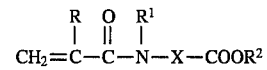

in which
R=H or CH$_3$,
R$^1$=H, alkyl or aryl,
R$^2$=alkyl and

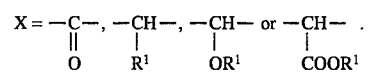

12. A composition as claimed in claim 3, in which the monomer component b) is a monomer containing hydroxyl groups and the compound (2) contains an ester or acid group in addition to the active hydrogen atoms or the group with active hydrogen atoms.

13. A composition as claimed in claim 3, in which b) is a monomer with a glycidyl group, and (2) contains a COOH or NH group in addition to the group (I).

14. A composition as claimed in claim 3, in which the monomer component b) contains a carboxyl group and the compound (2) is a reaction product of a polyepoxide with n moles of epoxy groups and (n–1) moles of a compound with COOH or NH groups and the group with an active hydrogen.

15. A composition as claimed in claim 4, in which compound (1) is an ester of an α,β-ethylenically unsaturated carboxylic acid, the alcohol component of which has up to 6 carbon atoms.

16. A composition as claimed in claim 6, in which the compound (1) is an isocyanatoalkyl ester of an unsaturated carboxylic acid of the general formula:

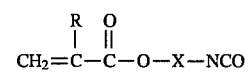

in which:
R=H, CH$_3$ or C$_2$H$_5$ and
X=(CH$_2$)$_n$, where n=1–12, or in which the compound (1) is m-isopropenyl, -dimethylbenzyl isocyanate or a reaction product of a diisocyanate with an OH—, NH—, SH— or —COOH-functional derivative of acrylic acid, methacrylic acid, fumaric acid, maleic acid, crotonic acid or dimethylacrylic acid.

17. A composition as claimed in claim 7, in which compound (1) is selected from the group consisting of: methoxymethylacrylamide, methoxymethylmethacrylamide, butoxymethylacrylamide, butoxymethylmethacrylamide, isobutoxymethylacrylamide, isobutoxymethylmethacrylamide, analogous amides of fumaric acid, crotonic acid and dimethylacrylic acid and glycolic acid derivatives.

18. A composition as claimed in claim 8 in which the compound (1) is selected from the group consisting of:

acrylic acid, methacrylic acid, crotonic acid, dimethylacrylic acid, monomethyl fumarate and the reaction product of an acid anhydride and an hydroxyalkyl ester of an α, β-unsaturated carboxylic acid.

19. A composition as claimed in claim 9, in which compound b) is selected from the group consisting of amino alkyl esters and hydroxyalkyl esters of acrylic acid, methacrylic acid, fumaric acid, crotonic acid and dimethylacrylic acid.

20. A composition as claimed in claim 10, in which monomer b) is selected from the group consisting of m-isopropenyl-α,β-dimethylbenzylisocyanate, isocyanatolkyl esters of α,β-unsaturated carboxylic acids and an adduct of isophorone diisocyanate and hydroxylalkyl (meth)acrylates.

21. A composition as claimed in claim 11, in which b) is selected from the group consisting of:
n-alkoxymethyl (meth)acrylamide and an alkyl ether of alkoxy(meth)acrylamidoglycolate.

22. A composition as claimed in claim 12, in which b) is an hydroxylalkyl ester of an α,β-unsaturated carboxylic acid and compound (2) is selected from the group consisting of acetoacetic acid, cyanoacetic acid, malonic acid, cyclopentanonecarboxylic acid, cyclohexanonecarboxylic acid and alkyl esters thereof.

23. A composition as claimed in claim 13, in which compound (2) is selected from the group consisting of acetoacetic acid, cyanoacetic acid, malonic acid, cyclopentanonecarboxylic acid and cyclohexanonecarboxylic acid.

24. A composition as claimed in claim 14, in which the compound (2) is the reaction product of one mole of trimethylolpropane triglycidyl ether and two moles of cyanoacetic acid or acetoacetic acid.

25. A composition as claimed in claim 1 in which component a) corresponds to the general formula:

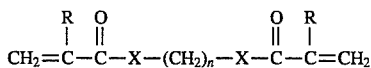

in which
R=H or CH$_3$,
X=O, NR' or S, where R'=H, alkyl or aryl, and
n=2 to 8.

26. A composition as claimed in claim 1 in which component a) is a reaction product of a carboxylic acid with a polymerizable, olefinically unsaturated double bond and glycidyl acrylate or glycidyl methacrylate.

27. A composition as claimed in claim 1 in which component a) is a polycarboxylic acid or unsaturated monocarboxylic acid esterified with an unsaturated alcohol containing a polymerizable double bond.

28. A composition as claimed in claim 1 in which component a) is prepared by reaction of a polyisocyanate with an unsaturated alcohol or amine containing a polymerizable double bond.

29. A composition as claimed in claim 1 in which component a) is a diester of polyethylene glycol or polypropylene glycol with an average molecular weight of less than 1,500 and acrylic acid or methacrylic acid.

30. A composition as claimed in claim 1 in which the soluble branched acrylate copolymer is obtained by copolymerization of:
a) 3 to 30% by weight of a dimethacrylate or divinyl compound;
b) 5 to 60% by weight of an ethylenically unsaturated monomer with a functional group;
c) 5 to 91% by weight of an ethylenically unsaturated monomer; and
d) 0.1 to 20% by weight of an ethylenically unsaturated monomer with a tertiary amino group,
the sum of a), b), c) and d) being 100% by weight and the resulting branched acrylate copolymer subsequently being reacted with the compound (1) to give component A).

31. A composition as claimed in claim 1 in which the soluble branched acrylate copolymer (P) is produced by copolymerization of:
a) 3 to 30% by weight of a dimethacrylate or divinyl compound;
b) 5 to 60% by weight of an ethylenically unsaturated monomer with a functional group;
c) 5 to 91% by weight of an ethylenically unsaturated monomer; and
d) 0.1 to 20% by weight of an ethylenically unsaturated monomer with a tertiary amino group,
the sum of a), b), c) and d) being 100% by weight and the soluble branched acrylate copolymer (P) subsequently being reacted with the compound (2) to give component (B).

32. The curable composition of claim 1 further comprising a catalyst.

33. The curable composition of claim 1 further comprising a pigment.

34. The composition according to claim 17 wherein compound (1) is a dimethyl acrylic acid and glycolic acid derivative selected from the group consisting of methyacrylamidoglycolate methyl ether, butylacrylamidoglycolate butyl ether, methylacrylamidoglycolate and butylacrylamidoglycolate.

35. A composition in accordance with claim 19 wherein the alkyl portion of the hydroxyalkyl ester is a member selected from the group consisting of methyl, ethyl, propyl, butyl, isobutyl, isopropyl and hexyl.

36. The composition of claim 21 wherein b) is methoxymethylacrylamide or isobutoxymethylacrylamide.

* * * * *

UNITED STATES PATENT AND TRADEMARK OFFICE
CERTIFICATE OF CORRECTION

PATENT NO. : 5,496,896
DATED : March 5, 1996
INVENTOR(S) : Alfons

It is certified that error appears in the above-indentified patent and that said Letters Patent is hereby corrected as shown below:

In column 5, line 26, change "1can" to --(1) can--;

line 36, change "(1 which," to --(1) which,--;

In column 6, line 40, change "isobutoxhymethylmethaclylamide" to --isobutoxymethylmethacrylamide--

In column 8, line 5, change "(p)" to --(P)--;

In column 11, line 13, change "5" to --b) 5--;

line 15, change "5" to --c) 5--.

Column 7, lines 60, 61 and 63, change "(p)' to --(P)--.

Signed and Sealed this

Fourteenth Day of October, 1997

*Attest:*

BRUCE LEHMAN

*Attesting Officer*     Commissioner of Patents and Trademarks